United States Patent [19]

Ito et al.

[11] 4,313,312

[45] Feb. 2, 1982

[54] WATER PRODUCING AIR CONDITIONING SYSTEM

[75] Inventors: Toshio Ito; Hiromasa Matsuoka; Yoshio Hirayama; Nobuyoshi Takahashi, all of Amagasaki, Japan

[73] Assignee: Mitsubishi Denki Kabushiki Kaisha, Tokyo, Japan

[21] Appl. No.: 133,432

[22] Filed: Mar. 24, 1980

[30] Foreign Application Priority Data

Mar. 22, 1979 [JP] Japan ............................ 54-34001

[51] Int. Cl.$^3$ ............................................. F25D 23/00
[52] U.S. Cl. ........................................... 62/271; 62/94
[58] Field of Search .......................... 62/94, 271, 93

[56] References Cited

U.S. PATENT DOCUMENTS 2,273,108  2/1942  Hibberd ............................ 62/94
2,557,204  6/1951  Richardson ....................... 62/94

*Primary Examiner*—Ronald C. Caposella

*Attorney, Agent, or Firm*—Oblon, Fisher, Spivak, McClelland & Maier

[57] ABSTRACT

A water producing-air conditioning system comprises a water producing apparatus which adsorbs moisture in the ambient air on an adsorbent or absorbent and evaporates water adsorbed on the adsorbent or absorbent by heating it and condenses steam to obtain water;

a heat-exchanger which heat-exchange the ambient air with a hot dry air discharged from said water producing apparatus during adsorbing moisture on the adsorbent or absorbent; and an evaporation-cooling apparatus for forming a cold wet air by evaporating water and cooling it by contacting water with a dry air at the ambient temperature passed through said heat-exchanger.

The hot air heated by said heat-exchanger or the cold air obtained from said evaporation-cooling apparatus is utilized for the air conditioning. The system can be used for comfortable living in a severe condition such as a desert by the effective combination of the evaporation-cooling apparatus with the water producing apparatus under utilizing heat-exchange in high efficiency.

6 Claims, 4 Drawing Figures

4,313,312

WATER PRODUCING AIR CONDITIONING SYSTEM

BACKGROUND OF THE INVENTION

1. Field of the Invention

The present invention relates to a water producing-air conditioning system which is formed by effectively combining a water producing apparatus and an air conditioning apparatus in balance to provide excellent total heat efficiency.

2. Description of the Prior Arts

Water is precious in a desert area. It is important to use the same water for various uses such as hand washing, foot washing and feeding to plants. When the same water is recycled for many times in various uses, it is possible to live with only a small quantity of an additional water at a place without rain falling for a long time.

In general, it is hot in daytime and it is cold in night to produce great temperature difference in a desert area. This phenomenon also causes difficulty in the living in the desert area together with the small rain falling. A large energy saving should be served in order to separately overcome these two phenomena. It is necessary to provide an effective system for utilizing energy and water even in a severe condition for living such as a desert area. It is possible to construct a village.

SUMMARY OF THE INVENTION

It is an object of the present invention to provide an effective water producing-air conditioning system which is a balanced and effective combination of a water producing apparatus and an air conditioning apparatus.

In accordance with the present invention, a water producing apparatus is used to produce water by absorbing moisture from air and to obtain a dry air at an ambient temperature by cooling with a wet air at the ambient temperature, a hot dry air discharged from the water producing apparatus. The dry air at the ambient temperature is useful for cooling at a low temperature because the dry air has lower enthalpy to effectively result in a high temperature falling by an evaporation-cooling. The present invention is to utilize the phenomena and to cool a dry air at the ambient temperature by an evaporation to obtain a wet air at a lower temperature and to utilize the lower temperature for an air conditioning.

DETAILED DESCRIPTION OF THE PREFERRED EMBODIMENTS

Figure 1:
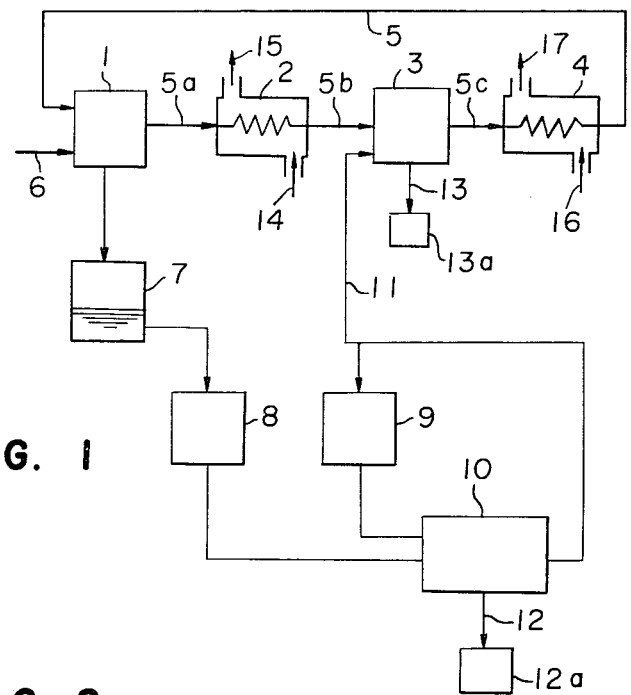
FIG. 1 is a block diagram of one embodiment of a water producing-air conditioning system of the present invention.
Figure 2:
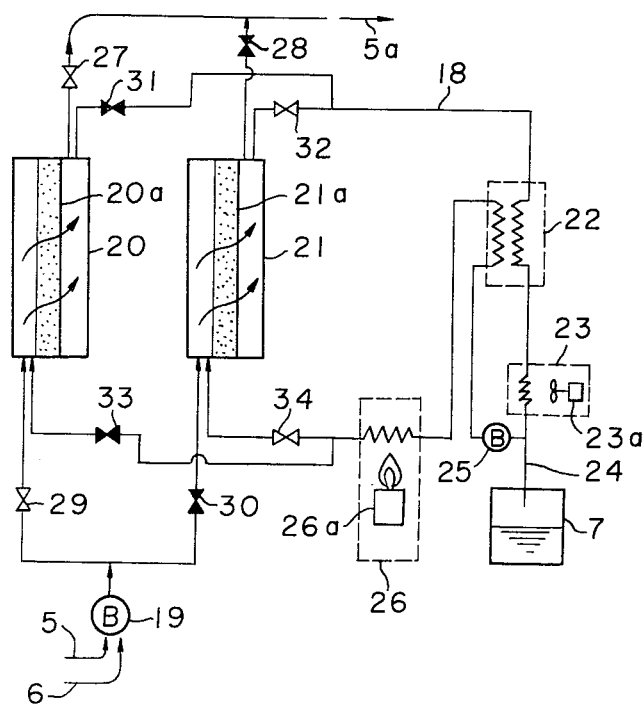
FIGS. 2 and 3 show one embodiment of a water producing apparatus as one element of the present invention.
Figure 3:
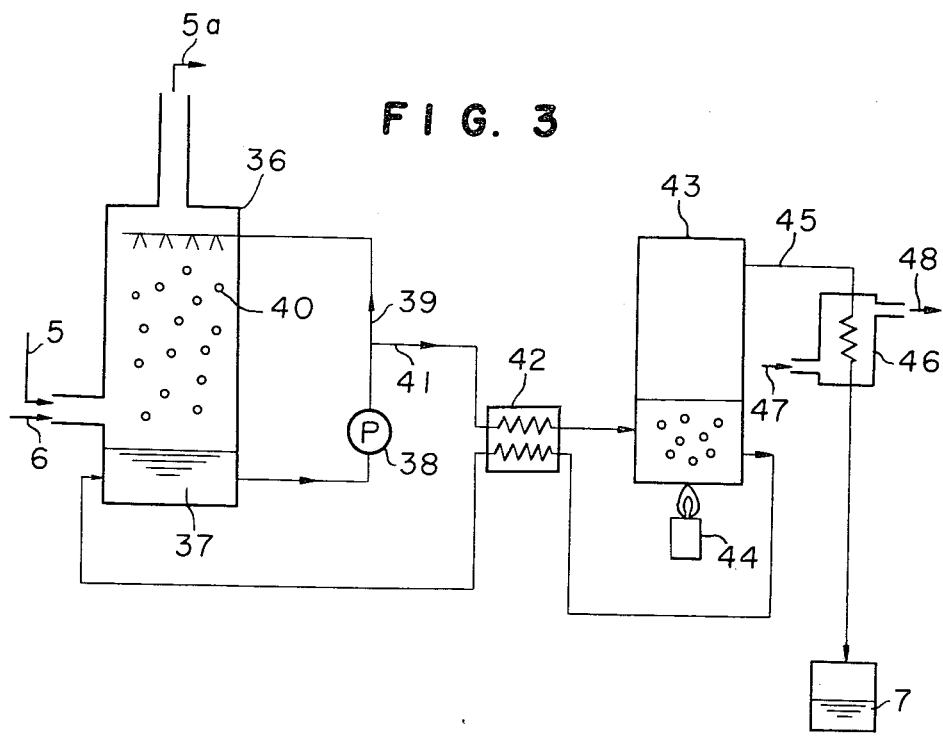

FIG. 1 shows one embodiment of the water producing system of the present invention. In FIG. 1 the reference numeral (1) designates a water producing apparatus, a detailed structure of which is shown in FIGS. 2 and 3; (2) designates a heat exchanger which heat-exchanges a hot dry air discharged from the water producing apparatus with the ambient air to cool the hot dry air to the ambient temperature; (3) designates an evaporation-cooling apparatus which cools the air discharged from the heat-exchanger (2) by contacting water with the air discharges from the heat-exchanger (2); (4) designates a heat-exchanger for cooling the ambient air with the cool air discharged from the evaporation-cooling apparatus (3); (5) designates a recycling passage for returning the air discharged from the heat-exchanger (4) to the water producing apparatus (1); (5a) designates a passage for feeding air from the water producing apparatus into the heat-exchanger (2); (5b) designates a passage for feeding air to the evaporation-cooling apparatus (3); (5c) designates a passage for feeding air from the evaporation cooling apparatus (3) into the heat-exchanger (4); (6) designates a passage for feeding the ambient air into the water-producing apparatus (1); (7) designates a water tank for storing water obtained by the water producing apparatus (1); (8) designates an equipment for utilizing water in the water tank (1) for drinking and cooking; (9) designates an equipment for utilizing the used water for reuses such as a flush toilet, a washing, a shower and a bath; (10) designates a waste water reuse-treating apparatus; (11) designates a passage for feeding water to the evaporation-cooling apparatus (3).

In FIG. 1, the thick lines show passages for air and the thin lines show passages for water.

Referring to FIGS. 2 and 3, a water producing apparatus as one element of the present invention will be described in detail.

FIG. 2 shows one embodiment of a water producing apparatus using a solid grain adsorbent such as a molecular sieve; (18) designates an air recycling passage for desorbing water from the adsorbent and recovering water; (19) designates a blower for feeding air into the adsorbent; as a blower for feeding the air from the passages (5), (6) to the absorbing towers (or water desorbing towers) (20), (21); (20a), (21a) designate adsorbent packed layers formed in the adsorbing towers (or the water desorbing towers); (22) designates a heat-exchanger; (23) designates a condenser; (23a) designates a fan for air-cooling; (24) designates a passage for feeding water obtained in the condenser (23) into the water tank (7); (25) designates a blower for recycling the uncondensed gas; (26) designates a heater for supplying heat required for desorbing water adsorbed on the adsorbent; (26a) designates a burner for the heater; (27) to (30) designate valves equipped in the passage of the ambient air; and (31) to (34) designate valves equipped in the passage for water desorption and recycling.

The operation of the water producing apparatus will be illustrated.

In the first step, the valves (27), (29) are opened and the valves (31), (33) are closed and the ambient air is fed into the desorbing tower (20) by driving the blower (19). The ambient air fed into the adsorbing tower (20) is passed through the adsorbent layer (20a) in the tower (20) to the arrow direction and is discharged through the valve (27). When the ambient air is passed through the adsorbent layer (20a), moisture in the ambient air is adsorbed on the adsorbent to dry the air and to increase the temperature because of the latent heat resulted by the adsorption. The dry air is fed into the heat-exchanger (2) shown in FIG. 1. The air-feeding is continued for certain time to reach the desired adsorbed state of the adsorbent (usually, the saturated adsorbed state). Then, the valves (27), (29) are closed and the valves (28), (30) are opened, and the valves (31), (33) are opened and the valves (32), (34) are closed. When the valves (31), (33) are opened, the air heated by the heater (26) is fed through the passage (18) to the adsorbent layer (20a) to desorb water. The adsorbing tower (20) is changed to the water desorbing tower at this time. This is further described in detail.

The gas which is heated at about 300° C. by the heater (26) and is fed into the adsorbing tower (20), supplies heat to the adsorbent to desorb water. The gas supplies heat to the adsorbent to be cooled at about 200° C. and is discharged from the water desorbing tower (20) together with steam formed by desorbing water from the adsorbent. The gas mixture is cooled by the heat-exchanger (22) and the condenser (23) to separate most of steam as water (substantially the same with the desorbed water). The remained gas is heat-exchanged with a cold gas to be cooled at about 100° C. (on the other hand, the cool gas is heated to about 200° C.). The gas cooled at about 100° C. is further cooled to about 50° C. by the condenser (23) to convert steam in the gas into water and water falls through the passage (24) into the water tank (7). On the other hand, the gas which is cooled to separate most of steam, is heated to about 200° C. by the heat-exchanger (22) and is heated to about 300° C. by the heater (26) and is fed into the adsorbing tower (20). The blower (25) is used for recycling the gas as described and can be equipped at any desired position in the recycling passage. When the blower (25) is equipped in the down-stream of the condenser (23), the temperature is the lowest at this position to be economical from the viewpoint of the substance for the blower.

The second step is finished by the desorption of water from the adsorbent after the desorption and the recovery of water.

When the second step is finished, the valves (27) to (34) are switched to the state of the first step. The operation has been described only for the adsorbing tower (20). An operation opposite to the steps of the adsorbing tower (20), is carried out in the adsorbing tower (21).

FIG. 3 shows one embodiment of the water producing apparatus using a concentrated solution of lithium bromide (hereinafter referring to as LiBr solution) as a liquid absorbent. The embodiment will be described in detail.

The water producing apparatus comprises the elements (36) to (48). The reference numeral (36) designates an adsorbing tower; (37) designates a LiBr solution at the bottom of the adsorbing tower (36). The LiBr solution (37) is fed through a passage (39) to the upper part of an adsorbing tower (36) by a pump (38) and is sprayed as a mist (40). The sprayed mist (40) if brought into contact with air fed through the passages (5), (6) to adsorb moisture in air. The hot dry air formed by adsorbing moisture is discharged through the passage (5a). The air is utilized in this embodiment and is fed into the heat-exchanger (2) shown in FIG. 1. When the LiBr solution is recycled, the water content in the LiBr solution is increased and the LiBr solution is diluted to decrease water adsorption efficiency. Thus, a part of the LiBr solution is fed from the pump (38) through the passage (41) and the heat-exchanger (42) to the distillation tower (43). The heat-exchanger (42) is used for heat-exchanging the hot LiBr solution (at about 160° C.) discharged from the distillation tower (43) with the cold LiBr solution (40° to 60° C.) fed into the distillation tower (43) to effectively utilize heat energy. The distillation tower (43) is heated by a heater (44) to evaporate water and to concentrate the LiBr solution.

The concentrated LiBr solution is recycled through the heat-exchanger (42) into the adsorbing tower (36) to adsorb moisture. On the other hand, the steam generated in the distillation tower (43) is fed through a passage (45) into a condenser (46) wherein the steam is condensed into water and water is stored in the water tank (7). The ambidient air (47) is fed into the condenser (46) to cool it. After passing through the condenser (46), the latent heat resulted in the condensation is absorbed to form a hot air (48) (50 ° to 80° C.), and the hot air is discharged.

The water producing apparatus using the solid grain adsorbent and the water producing apparatus using the liquid absorbent which can be used as one element of the present invention have been described in detail.

The evaporation-cooling apparatus (3) will be described.

Figure 4:
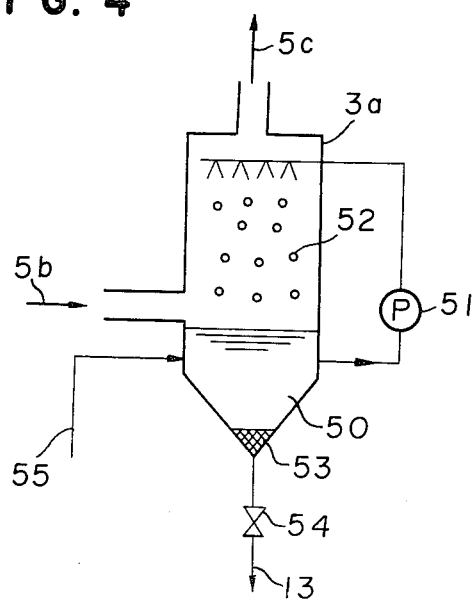
FIG. 4 shows one embodiment of an evaporation-cooling apparatus as the other element of the present invention.

FIG. 4 shows one embodiment of the evaporation-cooling apparatus. The reference numeral (3a) designates an evaporation-cooling tower; (50) designates water stored at the bottom of the evaporation-cooling tower (3a); (51) designates a pump by which the water (50) is sprayed at the upper part of the evaporation cooling-tower (3a). The water mist (52) formed by the water spraying is brought into contact with the air (5b) fed to the arrow direction as the gas-liquid contact whereby water is evaporated and the cooled air (5b) is discharged to the arrow direction. The air is fed into the heat-exchanger (4) shown in FIG. 1. On the other hand, the water is decreased by the evaporation and accordingly, water is fed through the passage (55). Only water is evaporated by the evaporation-cooling. When the water fed through the passage (55) contains a suspending impurity or a salt, the impurity or the salt is gradually concentrated to deposit a precipitate (53) at the bottom. The precipitate is discharged by opening a valve (54) at a desired time.

The total operation of the system of the present invention will be described.

The air passed through the adsorbent layer in the water producing apparatus (1) is dried by removing moisture and is heated by the latent heat of adsorption. The raised temperature is proportional to the water removed by the adsorption for a unit volume of the ambient air. The temperature is usually raised at a rate of 2.5° C. per a removal of water of 1 g. from the air having a volume of 1 $m^3$. For example, when the moisture is adsorbed from the ambient air having 10 g. -water/$m^3$-air to form an air having 3 g.-water/$m^3$-air, the temperature is raised for about 17.5° C. [$(10-3) \times 2.5 = 17.5$]. When the ambient air at 30° C. is fed into the adsorbing tower (20), it is discharged as a dry air at 47.5 °C. The hot dried air is cooled with the air at the ambient temperature by the heat-exchanger (2) to form a dry air at about the ambient temperature (30° C.). The dry air at the ambient temperature is brought into contact with water in the evaporation-cooling apparatus (3) to evaporate water and to cool it. The evaporated water becomes the moisture in the air. The temperature falling caused by the evaporation-cooling is proportional to the content of water increased in the air and is substantially the same as the value for the temperature raising. The temperature is fallen at a rate of 2.5° C. per an addition of water of 1 g. in the air having a volume of 1 $m^3$. For example, when the water is desorbed from the air having 3 g.-water/m³-air to form an air having 10 g.-water/m³-air, the temperature is fallen for about 17.5° C. Therefore, the dry air at the ambient temperature of 30° C. is fallen to 12.5° C. An evaporation of water is greater to fall the temperature at higher rate depending upon the dryness of the air. The use of dry air is convenient to result in a lower temperature by the evaporation-cooling. In the evaporation-cooling, water is decreased by the evaporation. Therefore, it is necessary to feed water for such decreased water. Clean water is not always required as the additional water, because the impurity in the water does not substantially affect to the evaporation of water. When the wasted water is fed, the suspended impurity in the wasted water is remained and the dissolved salt is precipitated by the concentration. Therefore, the impurity and salt are separated. The wasted water can be fed as the water for the evaporation-cooling. In this case, only water is evaporated and the other components such as the salt are remained and can be separated, if desired. The cold humidified air obtained by the evaporation-cooling apparatus (3) is fed into the heat-exchanger (4) in the arrow direction to cool the air (16) at the ambient temperature (air in the ambient or room). The cooled air (17) is fed into the room for the air conditioning. The cold humidified air is heat-exchanged with the air at the ambient temperature to lose the cold heat to be about the ambient temperature and is passed through the passage (5) into the water producing apparatus (1) in the recycling operation.

In said example, the water content in the humidified air at the ambient temperature is 10 g.-water/m³-air and is converted into the hot dry air having 3 g.-water/m³-air by the water producing apparatus. Thus, the operation is repeated.

The air cooled by the evaporation-cooling apparatus (3) can be directly fed into a room for the air conditioning.

On the other hand, water obtained from the water producing apparatus (1) is substantially the same as the quantity of the adsorbed water (a slight loss in the water producing apparatus is found). In said example, about 7 g. of water is obtained from 1 m³ of the ambient air. A total amount of water for one person per day (including water for drinking-cooking and plate-cup-washing) is about 10 kg. A volume of the ambient air required for producing 10 kg. of water per day is about 1430 m³ $[10 \times 10^3 (g)/7 (g/m^3)]$. When the apparatus is driven all day long, the volume of the ambient air is at a rate of 60 m³/hour (1 m³/min.). The water required for the living can be obtained from only small volume of the air.

On the other hand, a heat energy for the air conditioning per one person is highly different under each condition, but it is in the order of several hundreds kcal./hour. When water is produced at a rate of 10 kg./person.day, the cold heat obtained from the heat-exchanger (4) is at a rate of about 250 kcal./hour. [60 (m³/hour)×17.5 (°C.)×0.24 (kcal./m³)]. This cold heat is satisfactory for the air conditioning at a rate of several hundreds kcal./hour.person.

That is, this system of the present invention is a balanced system for providing the required water and the required cold heat for the air conditioning. Water and the cold heat can be effectively utilized without a loss.

The water obtained by the water producing apparatus (1) is stored in a water vessel (7) to use for drinking and cooking at any time. The wasted water (including urine) is fed into the waste water reuse treating apparatus (10) in which various water sources come from a toilet, a washing equipment, a shower and a bath (9) are fed so as to treat them to obtain a reusable water. The quantity of water required for the equipments (9) is about ten times of the waste water used for the equipment (8). The capacity of the waste water reuse treating apparatus is about 100 kg./person.day. Therefore, when ten persons are living in one house, it requires 1 ton/day. In a building or apartments for living 1000 persons, it requires 100 ton/day [0.1 (ton/person.day×1000]. The capacity of the water treating apparatus is not so large and a space can be reasonably small. A part of water obtained by the reused treatment is fed into the evaporation-cooling apparatus (3). The quantity of water is substantially the same as the quantity of the water produced depending upon the required cold heat for the air conditioning. Therefore, a loss of water causes a shortage of a total amount of water for the loss.

The largest loss of water is the water discharged with dirt wastes in the waste water reuse treatment. The quantity of the loss of water is depending upon the reuse treatment and is at a ratio of about several %, sometimes 20%.

In accordance with the system of the present invention, the shortage of water is compensated by feeding the ambient air through the passage (6) into the water producing apparatus (1). In general, an air conditioning operation is not required in night or can be reduced. Therefore, the shortage of water is compensated in night by feeding the ambient air into the water producing apparatus. The capacity of the water producing apparatus can be minimized.

The water producing apparatus for producing water at a rate of 1 ton per day (to produce water for 1000 persons) requires a size of a floor area of about 20 m² (2 m×10 m) and a height of about 2 m. The evaporation-cooling apparatus (3) can be a conventional cooling tower and can be small.

The total system for living 1000 persons (10 ton/day) requires a size only, a floor area of about 1000 m² (20 m×50 m) which corresponds an area of one floor in a ten floor building for working 1000 persons. The total system can be placed on a base floor. It is also preferable to place the evaporation-cooling apparatus (3) and the heat-exchangers (2), (4) on the roof and the water system on the base floor.

The total energy required for the total system of the present invention is a consumption of an oil at a rate of 1.5 ton per day for 1000 persons. The running cost can be calculated from the consumption of the oil. (about 45,000 Yen per day at an oil cost of 30 Yen per kg.).

The electric power required for an air conditioning of such building for 1000 persons is about 3000 KWH/day (about 45,000 Yen per day at an electric power cost of 15 Yen/KWH). Thus, the total running cost is substantially the same as the cost for only the air conditioning by the electric power.

The system of the present invention can be used not only for the air conditioning but also for the reuse of water. Therefore, the system is remarkably economical. As described above, the system of the invention is not a simple connection of the apparatuses for the purposes but is the effective combination of the apparatuses to improve the efficiency.

In the cooling of the hot dry air discharged from the water producing apparatus, air cooling method is employed because the system of the present invention is usually used in a place for a shortage of water.

In a place for a shortage of water, water obtained by producing water should be used for living. It is not economical to use water obtained by the water producing apparatus as the water for the evaporation-cooling operation. The produced water is not drained but is reused.

As described above, in accordance with the present invention, the apparatuses are effectively combined so as to effectively utilize heat and water without a loss so as to attain a saving of energy and a saving of water.

As it is clearly understood by the above-mentioned description, it is unnecessary to recycle the wet air at the ambient temperature through the passage (5), after the heat-exchanger (4) in a place for obtaining the ambient air having high humidity. The ambient air can be always fed through the passage (6). In said case, the wet air at the ambient temperature can be discharged out of the apparatus after passing through the heat-exchanger (4).

In a dry place, the cold wet air passed through the evaporation-cooling apparatus (3) is directly fed into the room for the air conditioning so as to control a humidity together with a cooling. In such case, it is unnecessary to use the heat-exchanger (4). The air of the room to which the cold wet air is fed, is recycled into the water producing apparatus (1) instead of feeding the cold wet air through the passage (5). This method is advantageous to eliminate the heat-exchanger (4).

The system of the present invention can be used for an air-heating. The hot air having normal humidity discharged from the heat-exchanger (2) to the arrow direction is fed into the room. In a desert area, a temperature difference between daytime and nighttime is high. It is hot in daytime but is cold in nighttime. In accordance with the system of the present invention, it is easy to attain the air conditioning in daytime and the heating in nighttime. This is the effective use of the system.

In the water producing apparatus, water adsorbed on the adsorbent in the second step for the water production, is evaporated and the steam is condensed to obtain water by the air-cooling. The air is discharged as a hot air having normal humidity, which can be used for the heating of the room.

In a place for a high humidity, the hot dry air discharged from the water producing apparatus can be directly fed into the room without feeding it into the heat-exchanger (2). In the place for high humidity, it is unnecessary to recycle the air through the passage (5). The air fed into the room can be kept in the room. It is also possible to have a shunt at the passage (5a) to feed a part of the dry air at the ambient temperature and a part of the water producing apparatus (1) or the water vessel (7) is treated by the evaporation-cooling to produce a cold water for drinking. A part of the water obtained from the water producing apparatus (1) or the water in the water tank (7) can be cooled with the water in the evaporation-cooling apparatus (3) (the temperature of the cold humidified air) to obtain a cold water for drinking. The air at the ambient temperature can be cooled with the cold water in the evaporation-cooling apparatus (3). In said case, the heat-exchange is carried out in the gas-liquid phase, the heat-exchanger can be advantageous by a small size. The heat-exchanger (4) is not required to prevent a pressure loss at this device and to save the power for recycling the passage (5).

Thus, it is necessary to consider for heat-exchanging the cold heat of the cold wet air to water by contacting water with the dry air at the ambient temperature in the counter current contact in the evaporation-cooling apparatus (3).

What is claimed is:

1. A system for producing water and conditioning air, comprising:
   a water producing means including means for introducing ambient air, means for adsorbing moisture from said ambient air on an adsorbent to produce hot dry air, means for evaporating said adsorbed moisture to produce steam and means for condensing said steam;
   means connected to said water producing means for utilizing said condensed steam and producing waste water;
   first heat exchanger means connected to said water producing means and adapted to heat exchange said hot dry air with ambient air to produce dry air at ambient temperature and heated air of ambient humidity;
   evaporative cooling means connected to said first heat exchanger means and said means for utilizing said condensed steam, said evaporative cooling means being adapted to contact said dry air at ambient temperature with at least a portion of said waste water to produce cool humid air; and
   means for utilizing said cool humid air to condition the air within a volume.

2. The system of claim 1 wherein said means for utilizing said cool humid air feeds said cool humid air directly into said volume.

3. The system of claim 1 wherein said means for utilizing said cool humid air includes a second heat exchanger connected to said evaporative cooling means and adapted to heat exchange said cool humid air with ambient air to produce cool air at ambient humidity, said cool air at ambient humidity being fed to said volume.

4. A system for producing water and conditioning air, comprising:
   a water producing means including means for introducing ambient air, means for adsorbing moisture from said ambient air on an adsorbent to produce hot dry air, means for evaporating said adsorbed moisture to produce steam and means for condensing said steam;
   means connected to said water producing means for utilizing said condensed steam and producing waste water;
   first heat exchanger means connected to said water producing means and adapted to heat exchange said hot dry air with ambient air to produce dry air at ambient temperature and heated air of ambient humidity;
   evaporative cooling means connected to said first heat exchanger means and said means for utilizing said condensed steam, said evaporative cooling means being adapted to contact said dry air at ambient temperature with at least a portion of said waste water to produce cool humid air; and
   means for utilizing said heated air at ambient humidity to condition the air within a volume.

5. The system of claim 4 wherein said means for utilizing said heated air feeds said heated air directly into said volume.

6. A system for producing water and conditioning air, comprising:

a water producing means including means for introducing ambient air, means for adsorbing moisture from said ambient air on an adsorbent to produce hot dry air, means for evaporating said adsorbed moisture to produce steam and means for using air to condense said steam;

means connected to said water producing means for utilizing said condensed steam and producing waste water;

first heat exchanger means connected to said water producing means and adapted to heat exchange said hot dry air with ambient air to produce dry air at ambient temperature and heated air of ambient humidity;

evaporative cooling means connected to said first heat exchanger means and said means for utilizing said condensed steam, said evaporative cooling means being adapted to contact said dry air at ambient temperature with at least a portion of said waste water to produce cool humid air; and means for utilizing said air used to condense said steam to condition the air within a volume.

* * * * *